United States Patent
Spengler et al.

(10) Patent No.: US 10,752,067 B2
(45) Date of Patent: Aug. 25, 2020

(54) CONNECTION SYSTEM FOR COUPLING A VEHICLE TO A TRAILER

(71) Applicant: Continental Teves AG & Co. oHG, Frankfurt (DE)

(72) Inventors: Ralf Spengler, Schaafheim (DE); Ulrich Stählin, Rochester, MI (US)

(73) Assignee: Continental Teves AG & Co. oHG (DE)

( * ) Notice: Subject to any disclaimer, the term of this patent is extended or adjusted under 35 U.S.C. 154(b) by 0 days.

(21) Appl. No.: 16/189,179

(22) Filed: Nov. 13, 2018

(65) Prior Publication Data

US 2019/0152282 A1    May 23, 2019

(30) Foreign Application Priority Data

Nov. 17, 2017   (DE) .................. 10 2017 220 585

(51) Int. Cl.
| | |
|---|---|
| *G08B 21/00* | (2006.01) |
| *B60D 1/64* | (2006.01) |
| *B60D 1/62* | (2006.01) |
| *B60Q 1/30* | (2006.01) |

(52) U.S. Cl.
   CPC .................. *B60D 1/64* (2013.01); *B60D 1/62* (2013.01); *B60Q 1/305* (2013.01)

(58) Field of Classification Search
   CPC ............ B60D 1/64; B60D 1/248; G01L 19/10
   USPC ...... 340/431, 438, 425.5; 701/33.4, 38.1, 78
   See application file for complete search history.

(56) References Cited

U.S. PATENT DOCUMENTS

| | | | | |
|---|---|---|---|---|
| 5,442,332 | A | * | 8/1995 | Hughes ................. B60Q 1/305 200/61.45 R |
| 5,739,592 | A | * | 4/1998 | Rigsby ..................... B60D 1/62 280/422 |
| 5,920,128 | A | * | 7/1999 | Hines .................... B60T 8/1708 307/10.1 |
| 6,558,167 | B2 | * | 5/2003 | Harmon .................. B60D 1/62 439/35 |
| 10,068,393 | B2 | * | 9/2018 | Andrus ................ G07C 5/0808 |
| 2002/0098718 | A1 | * | 7/2002 | Harmon .................. B60D 1/62 439/35 |
| 2006/0085099 | A1 | * | 4/2006 | Burlak ..................... B60D 1/62 701/1 |
| 2016/0052453 | A1 | * | 2/2016 | Nalepka .................... B60R 1/00 348/148 |
| 2017/0021684 | A1 | | 1/2017 | McAllister |
| 2018/0001901 | A1 | * | 1/2018 | Durney ................. B60R 16/023 |

OTHER PUBLICATIONS

German Search Report for German Application No. 10 2017 220 585.7, dated Oct. 15, 2018, with partial translation—10 pages.

* cited by examiner

*Primary Examiner* — Tai T Nguyen
(74) *Attorney, Agent, or Firm* — RatnerPrestia

(57) ABSTRACT

A connection system for coupling a vehicle to a trailer, having a first plug connector, which is configured to connect the connection system to the vehicle, a second plug connector, which is configured to connect the connection system to the trailer, and a V2X-based communication device which is configured to process at least one signal which is transmittable from the vehicle to the trailer.

16 Claims, 3 Drawing Sheets

CONNECTION SYSTEM FOR COUPLING A VEHICLE TO A TRAILER

CROSS REFERENCE TO RELATED APPLICATIONS

This application claims priority to German Patent Application No. 10 2017 220 585.7, filed Nov. 17, 2017, the contents of such applications being incorporated by reference herein.

FIELD OF THE INVENTION

The present invention relates to a connection system for coupling a vehicle to a trailer

BACKGROUND OF THE INVENTION

Vehicle-to-X communication (V2X) based on IEEE 802.11p for vehicles is currently being introduced onto the market and improves the digital communication capabilities of vehicles with the intention of increasing safety for the subscribing road users and optimizing traffic flow. Vehicle-to-X communication includes vehicle-to-vehicle communication (V2V) and vehicle-to-infrastructure communication (V2I). V2V communication enables information to be exchanged between different vehicles, such as for example information about the position and velocity of the vehicles in question, so as to prevent accidents between the subscribing vehicles. V2I communications may provide vehicles with information about their traveling environment, such as for example traffic information or information about obstacles in a road.

The technological basis for a digitally networked vehicle is provided by a corresponding V2X communication device in a vehicle. In newly produced vehicles which are designed with a digital communication capability, this V2X-based communication device is already permanently installed as original equipment. However, if only new vehicles have this technology fitted, then the range of use and spread of this new technology is restricted.

For this reason, it is desirable for this modern technology to even be retrofittable to older vehicles or vehicles built at an earlier point in time, so that these vehicles may also be digitally networked with new, current generation vehicles.

SUMMARY OF THE INVENTION

Therefore an aspect of the present invention provides an efficient vehicle concept which allows simple and quick retrofitting with a V2X-based communication device.

According to a first aspect, the invention relates to a connection system for coupling a vehicle to a trailer having a first plug connector for signal transmission, which is configured to connect the connection system to the vehicle, a second plug connector for signal transmission, which is configured to connect the connection system to the trailer, and a V2X-based communication device which is configured to process at least one signal which is transmittable from the vehicle to the trailer.

The vehicle may for example be a motor vehicle, in particular a passenger car, a truck, a motorbike, an electric vehicle or a hybrid vehicle.

The idea underlying an aspect of the present invention is in that the connection system according to an aspect of the invention makes it possible to retrofit a V2X-based communication device to vehicles which have an existing trailer coupling. The first plug connector of the connection system according to an aspect of the invention is in this respect configured such that it is connectable to a standardized plug or a so-called vehicle-mounted plug connection element of the trailer coupling of the vehicle.

In this way, it is possible for the V2X-based communication device to receive the at least one transmitted signal—a vehicle signal—transmitted from the vehicle to a trailer if such a trailer is connected to the vehicle in order to use and process it for its own signal processing. No trailer needs to be connected to the vehicle itself for this purpose. It is sufficient for the vehicle to have a corresponding standardized interface, generally said standardized plug, which is installed as standard as part of a trailer coupling.

The mode of operation of the V2X communication device, such as for example the emission of V2X-relevant signals to an environmental object, such as for instance another vehicle located in the surroundings of the vehicle or an infrastructure object, may then be made dependent on this at least one (vehicle) signal when the V2X communication device is connected to the vehicle or to the vehicle-mounted plug connection element of the vehicle, i.e. the standardized plug, via the connection system according to an aspect of the invention. The connection system according to an aspect of the invention may in this respect also be denoted an adapter plug for a trailer coupling of the vehicle, which is fitted between vehicle and trailer.

One advantage which is achieved by an aspect of the present invention is the fact that existing vehicles and vehicles from older series, which have a trailer coupling but were not supplied with corresponding V2X technology as original equipment and therefore also do not have a permanently installed V2X communication device as original equipment, can be retrofitted quickly and simply with this new technology, as a V2X communication device can be connected to the vehicle using the connection system according to an aspect of the invention.

This retrofitting is also very cost-efficient, since a corresponding connection, specifically the vehicle plug connection element, which is permanently prefitted as standard to the vehicle as part of an existing vehicle trailer coupling, can be used to connect the connection system according to an aspect of the invention to the vehicle-mounted plug connection element of the vehicle. The connection system may then comprise the V2X communication device or be connected correspondingly therewith. Via the vehicle-mounted plug connection element of the vehicle, signals originating from the vehicle, relating for example to a power supply, vehicle indicator status or brake light status, which, when a trailer is connected to the vehicle, are otherwise transmitted in a known manner to the trailer only, are now also additionally relayed or transmitted via the connected connection system according to an aspect of the invention to the V2X communication device for internal processing and internal use.

Such use of this at least one vehicle signal could for example result in the V2X communication device only emitting corresponding signals or messages to environmental objects when the V2X communication device or the vehicle connected to this device is also participating actively in traffic. This achieves the advantage that the V2X communication device may be operated energy-efficiently, and existing energy sources, which may be located in the vehicle itself and/or may constitute a component of the V2X communication device or of the connection system, are used economically to supply the V2X communication device with energy.

According to a preferred embodiment of the present invention, the communication device has a housing and the first plug connector and the second plug connector are configured on the housing. This achieves the advantage that the connection system may be fitted very simply as a so-called adapter plug between the vehicle and optionally a possible trailer. In this way also, the connection system may be connected very easily to the vehicle via the plug connector, such that no additional tools are needed to fit the connection system to the vehicle and to the trailer.

According to one preferred embodiment of the present invention, the connection system comprises a signaling device, which comprises the first plug connector and the second plug connector and wherein the signaling device is configured to relay the at least one signal, which is transmittable from the vehicle to the trailer, via a communication interface to the communication device. This achieves the advantage that the communication device may be fitted very simply at any location on the vehicle and it is not essential to modify or adapt existing components of the vehicle in order to create corresponding space for fitting the communication device.

According to one preferred embodiment of the present invention, the first plug connector of the connection system is connectable to a plug connection element of the vehicle in order to connect the connection system to the vehicle. This achieves the advantage that the connection system may be very simply connected or fitted to the vehicle.

According to one preferred embodiment of the present invention, the plug connection element of the vehicle is configured to provide the at least one signal. This achieves the advantage that the at least one signal or this at least one vehicle signal is transmitted efficiently to the connection system connected to the plug connection element and provided for further processing and relaying.

According to one preferred embodiment of the present invention, the plug connection element takes the form of a plug connection element standardized to DIN ISO 11446. This achieves the advantage that, for connecting the connection system to the vehicle, recourse can be had to an existing, standardized interface or connection solution widely used in vehicles with trailer couplings. As a consequence, there is no need to attach a separate plug on the vehicle for connecting the vehicle to the connection system.

According to one preferred embodiment of the present invention, the communication device has a first communication module, which is configured to receive first data from at least one data transmitting device via a first communication interface; a second communication module, which is configured to receive second data from at least one environmental object via a second communication interface, and a controller, which is configured to generate, on the basis of the first data and/or the second data, a communication signal which is emitted by the second communication module. This achieves the advantage that the communication device may be operated as a V2X-based apparatus, meaning that the vehicle may efficiently exchange information and data about the generated communication signal with other vehicles or environmental objects.

According to one preferred embodiment of the present invention, the controller is configured to receive the at least one signal of the vehicle, wherein, in order to emit the generated communication signal to the at least one environmental object, which may be a vehicle or an infrastructure object, the controller is further configured to decide on the basis of the at least one signal of the vehicle whether the second communication module is actuated. This achieves the advantage that the communication device may be operated energy-efficiently, as the at least one signal of the vehicle enables the communication device to identify whether the vehicle is participating in road traffic. If this is the case, then the communication signal may be emitted by the second communication module. Otherwise the communication signal is not emitted.

According to a preferred embodiment of the present invention, the second communication interface is configured as a V2X communication interface. This achieves the advantage that the communication device is able to emit data to other environmental objects, such as vehicles or infrastructure objects, and receive data therefrom. In this way, the vehicle is efficiently digitally networked with its surroundings.

According to one preferred embodiment of the present invention, the first data comprise direct or indirect information about a position and/or a time of the data transmitting device. This achieves the advantage that the communication device can simply determine the position of the vehicle itself with which the communication device is connected on the basis of these first data from the data transmitting device, which may comprise at least one satellite and/or one mobile base station.

According to one preferred embodiment of the present invention, the second data comprise direct or indirect information about a position and/or a velocity of and/or a warning relating to the environmental object. This achieves the advantage that the vehicle is able to detect the state of motion of the environmental object and to take it into account when determining and initiating road traffic-relevant measures for safe vehicle travel.

According to one preferred embodiment of the present invention, the first communication module is configured as a GNSS receiver, which is connectable to at least one antenna, and the second communication module is connectable to at least one antenna. This achieves the advantage that the first communication module is able to receive signals from at least one satellite on the basis of, for example, GPS or Glonass etc.

According to one preferred embodiment of the present invention, the antenna of the first communication module and/or the antenna of the second communication module is integrated in the housing of the communication device. This achieves the advantage that a space-saving antenna connection is implementable.

According to one preferred embodiment of the present invention, the at least one signal comprises information about a status of a vehicle indicator and/or a status of a vehicle light and/or a status of a power supply unit of the vehicle. This achieves the advantage that the status of the vehicle or of individual components of the vehicle, which may signal an operating and/or motion status of the vehicle, may be efficiently detected and relayed for further processing, for example by the communication device and/or optionally by a trailer connected to the vehicle.

According to a second aspect, the present invention relates to a vehicle comprising a communication device which is connectable to the vehicle via a connection system. This achieves the advantage that the communication device may be connected simply and efficiently to the vehicle and also detached again therefrom.

BRIEF DESCRIPTION OF THE DRAWINGS

Further exemplary embodiments are explained in greater detail with reference to the appended figures.

DETAILED DESCRIPTION OF THE INVENTION

The following detailed description makes reference to the appended drawings, which form part thereof and in which specific embodiments which explain aspects of the invention are shown by way of illustration. It should be understood that other embodiments may also be used, and structural or logical modifications may be made without deviating from the concept underlying aspects of the present invention. The following detailed description should not therefore be understood as limiting. It should also be understood that the features of the various exemplary embodiments described herein may be combined with one another unless specifically stated otherwise.

Figure 1:
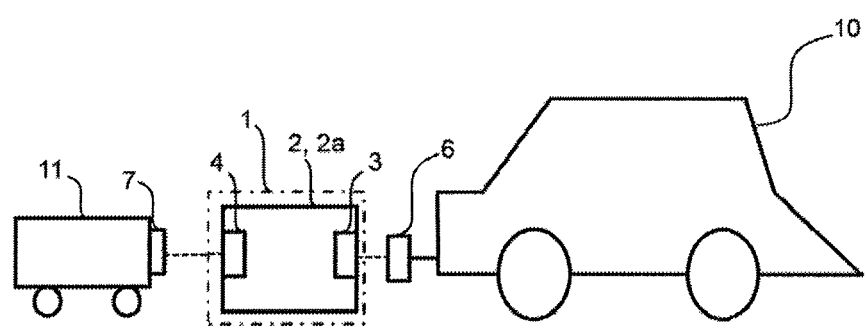
FIG. 1 shows a schematic depiction of a connection system for a vehicle with a trailer according to a first embodiment of the invention.

FIG. 1 shows a schematic depiction of a connection system 1 for a vehicle 10 with a trailer 11 according to a first embodiment of the invention. The connection system 1 for coupling the vehicle 10 to a trailer 11 comprises a first plug connector 3 for signal transmission, which is configured to connect the connection system 1 to the vehicle 10, a second plug connector 4 for signal transmission, which is configured to connect the connection system 1 to the trailer 11, and a V2X-based communication device 2 which is configured to process at least one signal which is transmittable from the vehicle 10 to the trailer 11.

The at least one signal, which may also be denoted the at least one vehicle signal and which is exchanged between the vehicle 10 and the trailer 11, is in this respect relayed to the V2X-based communication device 2.

According to FIG. 1, the communication device 2 of the connection system 1 has a housing 2a. In this case, the first plug connector 3 and the second plug connector 4 are configured on the housing 2a.

According to FIG. 1, the connection system 1 is connected via the first plug connector 3 to a plug connection element 6 of the vehicle 10. The plug connection element 6, which may also simply merely be denoted a (vehicle-mounted) plug 6, may be a component of the trailer coupling, not shown, of the vehicle 10.

The plug connection element 6 is configured to provide the at least one signal, i.e. the vehicle signal, which is exchanged between the vehicle 10 and the trailer 11 via the connection system 1.

The plug connection element 6 here is configured as a plug connection element standardized for example to DIN ISO 11446, incorporated herein by eference. This is a standardized interface configured as a vehicle-mounted plug and conventional for vehicles with trailer couplings. By using a standardized trailer coupling plug 6 as interface between the communication device 2 and the vehicle 10, it is simply and inexpensively possible to provide a uniform solution for retrofitting vehicles with V2X technology.

Figure 4:
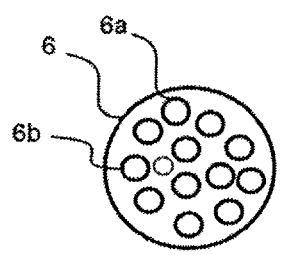
FIG. 4 shows a schematic depiction of a standardized plug connection element of the vehicle according to one embodiment of the present invention.

FIG. 4 is a schematic diagram of the plug connection element 6. The plug connection element 6 comprises a number of signal carrier elements 6a and 6b. The individual signal carrier elements, which lead, in the form of respective individual leads, to vehicle components of the vehicle 10 which are not shown, are each configured to transport individual and different vehicle signals. FIG. 4 shows, by way of example, a 13-pin plug 6 with a signal carrier element 6a and a signal carrier element 6b. A wide variety of vehicle signals, which are normally also exchanged between the vehicle 10 and the trailer 11, are thus retrievable via the plug 6.

In this case, if the trailer 11 is connected to the vehicle 10, the plug 6 is connected to the trailer-mounted plug connection element 7, as shown in FIG. 1. In FIG. 1, however, the connection system 1 is fitted between the trailer 11 and the vehicle 10. The first plug connector 3 of the connection system 1 is in this case connected to the vehicle-mounted plug connection element 6 of the vehicle 10. The second plug connector 4 of the connection system 1 is connected or connectable to the trailer-mounted plug connection element 7 of the trailer 11.

It should be noted here that connection of a trailer 11, as illustrated by way of example in FIG. 1, is not a prerequisite for the coupling or connection of the connection system 1 to the vehicle-mounted plug connection element 6. As long as the connection system 1 is coupled to the vehicle 10 or to the vehicle-mounted plug connection element 6 of the vehicle 10 via the first plug connector 3, the at least one (vehicle) signal of the plug connection element 6 can be relayed to the connection system 1.

The at least one signal, i.e. the vehicle signal, which is exchanged between the vehicle 10 and the trailer 11 via the connection system 1, may in this respect comprise information about a status of a vehicle indicator and/or a status of a vehicle light and/or a status of a power supply unit of the vehicle 10. Possible vehicle lights are tail lights, brake lights, reversing lights and/or rear fog lamps. The plug 6 illustrated in FIG. 4 may thus make available such a signal or a plurality of such vehicle signals via its respective signal carrier elements for further use in the connection system 1 or in the communication device 2.

Using these vehicle signals, it is thus possible to provide the necessary information for V2X communication device 2. It is, for example, possible to identify by way of the tail lights and/or the power supply whether the vehicle 10 has been started up and is thus participating in road traffic. Otherwise, no communication signal is sent by the V2X communication device 2. The indicator status is important for data fields in the standardized V2X messages of the communication device 2. The brake light may be used as a basis for a triggering condition for the electronic brake light (EEBL). The reversing light helps in determining movement or in dead reckoning.

According to the embodiment of FIG. 1, the connection system 1 comprises the communication device 2, wherein the communication device 2 is configured as a so-called "plug", in which the first plug connector 3 of the housing 2a of the communication device 2 is connected to the plug connection element 6 of the vehicle 10. In this case, it is advantageous, as in the embodiment of FIG. 1, for the entire electronics system, i.e. the communication device 2, to be directly integrated into this "plug" of the connection system 1.

The necessary antennas for IEEE 802.11p and GNSS may here be embodied by way of additional plug connectors, to which cables are then connected. It may thus be ensured that the cables do not just become detached and the connection system 1 or the communication device 2 connected to the respective antennas is not damaged irreparably thereby.

Two antennas are ideally provided for IEEE 802.11p, so as to enable 360° coverage even with difficult vehicle contours. Diversity of the two antennas is then used for this purpose. To be able to use the same solution where there is just one antenna, the communication device 2 should automatically identify whether two antennas are connected and use diversity only if this is the case. Otherwise, the 11p path which is not connected is disabled (including the RF path).

Instead of antennas connected to the communication device 2 by cable, a rod antenna may also be used. This is ideally configured such that it is supported mechanically on the trailer coupling and extends upwards to such an extent that 360° coverage may be achieved for 11p (one antenna is then sufficient for 11p). GNSS should be mounted at the tip of the rod antenna, so as to achieve the best possible reception.

Another option for the antennas is a "bracket", which leads to the right and left. This bracket is ideally attached to the bumper of the vehicle 10 and has an 11p antenna at each end. The GNSS antenna may in this case be connected by cable (so as to be placed on the roof) or is mounted at one end of the bracket.

The connection system 1 according to the embodiment of FIG. 1 is ideally configured as an adapter plug, such that a normal trailer 11 may additionally be connected to the vehicle 10 even if the connection system 1 remains plugged in. In this case, it is advantageous for this adapter plug to be somewhat thin (in the direction of the adapter plug) and conversely wide and high (from the perspective of the adapter plug), so as not to cause unnecessary difficulties with trailer coupling.

Figure 2:
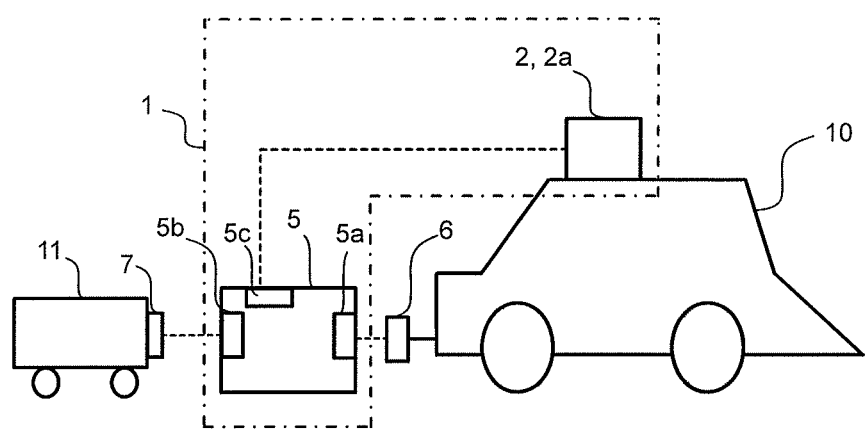
FIG. 2 shows a schematic depiction of a connection system with a signaling device for a vehicle with a trailer according to a second embodiment of the invention.

FIG. 2 shows a schematic depiction of a connection system 1 for a vehicle 10 with a trailer 11 according to a second embodiment of the invention. The embodiment shown in FIG. 2 of the connection system 1 according to an aspect of the invention differs from the embodiment of FIG. 1 in that the connection system 1 here also comprises a signaling device 5, which may also be designated a "dongle". The connection system 1 according to FIG. 2 thus consists of the communication device 2 and the signaling device 5.

In the embodiment according to FIG. 2, the signaling device 5 of the connection system 1 comprises a first plug connector 5a and a second plug connector 5b. The signaling device 5 is configured to relay the at least one signal which is transmittable from the vehicle 10 to the trailer 11, i.e. which is exchanged between the vehicle 10 and the trailer 11, via a communication interface 5c to the V2X-based communication device 2 for processing and further use.

The signaling device 5 may be connected in a wireless or wired manner to the communication device 2 via the communication interface 5c, which may be configured for example as a Bluetooth interface. In the embodiment shown in FIG. 2, the signaling device 5 is thus fitted to the plug connection element 6 of the vehicle 10 and transmits the at least one signal from the vehicle via the communication interface 5c to the communication device 2.

This embodiment of FIG. 2 achieves the advantage that the communication device 2 may be mounted at any position on the vehicle 10 (or on the trailer 11) and the dimensions of the communication device 2 play only a subordinate role in the selection of a suitable installation location on or in the vehicle 10. In FIG. 2, the communication device 2 is mounted on the roof of the vehicle 10.

Figure 3:
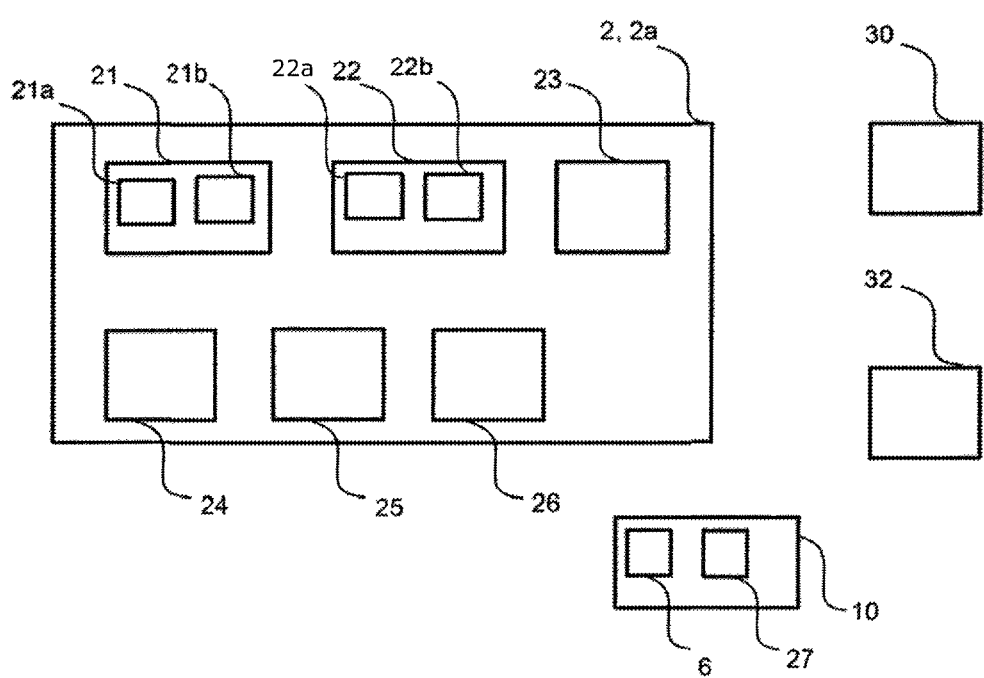
FIG. 3 shows a schematic depiction of the communication device of the connection system according to one embodiment of the present invention.

FIG. 3 shows a schematic depiction of the V2X-based communication device 2 of the connection system 1 according to one embodiment of the present invention. The structure and mode of operation of the communication device 2 are therefore described in greater detail below.

According to FIG. 3, the communication device 2 has a first communication module 21, which is configured to receive first data from at least one data transmitting device 32 via a first communication interface 21a. The first data may in this case directly or indirectly comprise information about a position and/or a time of the data transmitting device 32. The data transmitting device 32 may here consist of at least one satellite and/or take the form of a mobile radio base station.

The first communication module 21 may take the form of a GNSS receiver, which is connectable in a wired or wireless manner to at least one antenna 21b, as illustrated in FIG. 3.

Furthermore, the communication device 2 has a second communication module 22, which is configured to receive second data from at least one environmental object 30 via a second communication interface 22a. The second data may directly or indirectly comprise information about a position and/or a velocity of and/or a warning relating to the environmental object 30.

The second communication module 22 is in this case connectable to at least one antenna 22b in a wired or wireless manner.

The antenna 21b of the first communication module 21 and/or the antenna 22b of the second communication module 22 may here in each case be integrally arranged in the housing 2a of the communication device 2. Alternatively, however, it is also possible for just the antenna 21b of the first communication module 21 or the antenna 22b of the second communication module 22 to be integrally arranged in the housing 2a of the communication device 2.

The environmental object 30 may here for example be another vehicle or a data-transmitting infrastructure, such as a traffic light or a traffic sign, which communicates or exchanges data with the vehicle 10 via the second communication interface 22a, which may be configured as a V2X communication interface according to IEEE 802.11p.

The communication device 2 further comprises a controller 23, which is configured to generate, on the basis of the first data and/or the second data, a communication signal which is emitted by the second communication module 22.

The controller 23 is configured to receive the at least one signal of the vehicle 10. Moreover, the controller 23 is configured to decide, on the basis of the at least one (vehicle) signal of the vehicle 10, which may consist of a plurality of different signals, whether the second communication module 22 is actuated to emit the generated communication signal to the at least one environmental object 30. It may thereby be ensured that the second communication module 22 only transmits when the vehicle 10 or the communication device 2 is also participating in road traffic.

According to the embodiment of FIG. 3, the communication device 2 may comprise a communication interface 24. This may be configured, for example, as a Bluetooth interface for sending or receiving data. This communication interface 24 may alternatively or additionally be installed in the second communication module 22.

This Bluetooth interface, which is moreover couplable with antennas which are not shown, may also be configured to transmit warning information to the driver or the occupants or a vehicle 10 assist system. The warning is then sent via this Bluetooth interface to a connected apparatus, for example a smartphone. A specific app may then be run thereon or a website displayed thereon which outputs the warnings. If the vehicle 10 is equipped for example with "Mirrorlink" or "Carplay", these may also be used. Ideally, in addition to the warnings, status information is also displayed, relating for example to the quality of GNSS reception or the quality of 11p reception. The position of the antennas connected to the communication device 2 may thus be simply and easily optimized. Instead of Bluetooth/Bluetooth LE, however, WLAN or another preferably wireless communication interface may also be used.

According to the embodiment of FIG. 3, the communication device 2 may comprise a power storage unit 26 which supplies the communication device 2 with power. The power storage unit 26, which may be configured as a battery or storage battery, may be connected to a power supply unit 27, operable for example at 12 volts, of the vehicle 10, as shown in FIG. 3. In that the connection system 1 is coupled to the vehicle 10 or to the plug 6 by means of the first plug connector 3, power may be transferred from the power supply unit 27 of the vehicle 10, which may be configured, for example, as a vehicle battery or another power supplier arranged in the vehicle 10, to the communication device 2 of the connection system 1. The at least one signal, which is exchanged between the vehicle 10 and the trailer 11, may thus also comprise corresponding power for operating the communication device 2 (and a trailer 11 connected to the vehicle 10).

According to FIG. 3, the communication device 2 may also comprise an inertial measuring unit (IMU) 25, for detecting rates of rotation and acceleration of the vehicle 10 or components of the vehicle 10. It is thus possible not only to determine the position/velocity/acceleration of the vehicle on the basis of GNSS signals from at least one satellite but also to carry out dead reckoning to provide assistance in the case of poor reception. No vehicle parameters have to be known for this purpose. In addition, using the acceleration sensors of the IMU, it can more readily be identified whether maneuvers are present in which a V2X signal or V2X message has to be sent, for example if an emergency braking warning of a vehicle is present.

LIST OF REFERENCE SIGNS

1 Connection system
2 Communication device
2a Housing
3, 5a First plug connector
4, 5b Second plug connector
5 Signaling device
6 Plug connection element (vehicle-mounted)
6a, 6b Signal carrier element
7 Plug connection element (trailer-mounted)
10 Vehicle
11 Trailer
21 First communication module
21a First communication interface
21b Antenna
22 Second communication module
22a Second communication interface
22b Antenna
23 Controller
24 Communication interface
25 Inertial measuring unit (IMU)
26 Power storage unit of the communication device
27 Power supply unit of the vehicle
30 Environmental object
32 Data transmitting device

The invention claimed is:

1. A connection system for coupling a vehicle to a trailer, comprising:
a first plug connector for signal transmission, which is configured to connect to a plug connection element mounted on the vehicle,
a second plug connector for signal transmission, which is configured to connect to a plug connection element mounted on the trailer, and
a V2X-based communication device which is configured to process at least one signal transmitted from the vehicle to the trailer via the first plug connector and the second plug connector.

2. The connection system according to claim 1, further comprising a housing which houses the communication device, the first plug connector and the second plug connector being provided on the housing.

3. The connection system according to claim 1, further comprising a signaling device, which comprises the first plug connector and the second plug connector and wherein the signaling device is configured to relay the at least one signal, which is transmittable from the vehicle to the trailer, via a communication interface to the communication device.

4. The connection system according to claim 1, wherein the plug connection element is configured to provide the at least one signal.

5. The connection system according to claim 4, wherein the plug connection element is configured as a plug connection element standardized to DIN ISO 11446.

6. The connection system according to claim 1, wherein the plug connection element is configured as a plug connection element standardized to DIN ISO 11446.

7. The connection system according to claim 1, wherein the at least one signal comprises information about at least one of a status of a vehicle indicator, a status of a vehicle light, or a status of a power supply unit of the vehicle.

8. A vehicle comprising a communication device which is connectable to the vehicle via a connection system according to claim 1.

9. A connection system for coupling a vehicle to a trailer, comprising:
a first plug connector for signal transmission, which is configured to connect the connection system to the vehicle,
a second plug connector for signal transmission, which is configured to connect the connection system to the trailer, and
a V2X-based communication device which is configured to process at least one signal which is transmittable from the vehicle to the trailer, wherein the communication device comprises:
a first communication module having a first communication interface which is configured to receive first data from at least one data transmitting device;
a second communication module having a second communication interface which is configured to receive second data from at least one environmental object, and
a controller, which is configured to generate, based on at least one of the first data or the second data, a communication signal which is emitted by the second communication module.

10. The connection system according to claim 9, wherein the controller is configured to receive the at least one signal of the vehicle, and wherein the controller is further configured to decide on the basis of the at least one signal of the vehicle whether the second communication module is actuated in order to emit the generated communication signal to the at least one environmental object.

11. The connection system according to claim 10, wherein the second communication interface is configured as a V2X communication interface.

12. The connection system according to claim 9, wherein the second communication interface is configured as a V2X communication interface.

13. The connection system according to claim 9, wherein the first data comprise direct or indirect information about a position and/or a time of the data transmitting device.

14. The connection system according to claim 9, wherein the second data comprise direct or indirect information about a position and/or a velocity of and/or a warning relating to the environmental object.

15. The connection system according to claim 9, wherein the first communication module is configured as a GNSS receiver, which is connectable to at least one antenna, and wherein the second communication module is connectable to at least one antenna.

16. The connection system according to claim 15, wherein the antenna of the first communication module and/or the antenna of the second communication module are integrated in the housing of the communication device.

* * * * *